United States Patent
Witte

(10) Patent No.: US 11,914,456 B2
(45) Date of Patent: Feb. 27, 2024

(54) METHOD AND DEVICE FOR SECURING ACCESS TO ENCODED VARIABLES IN A COMPUTER PROGRAM

(71) Applicant: Siemens Aktiengesellschaft, Munich (DE)

(72) Inventor: Karl-Hermann Witte, Fürth (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 18/028,584

(22) PCT Filed: Sep. 3, 2021

(86) PCT No.: PCT/EP2021/074357
§ 371 (c)(1),
(2) Date: Mar. 27, 2023

(87) PCT Pub. No.: WO2022/069153
PCT Pub. Date: Apr. 7, 2022

(65) Prior Publication Data
US 2023/0305911 A1    Sep. 28, 2023

(30) Foreign Application Priority Data
Sep. 29, 2020    (EP) .................... 20199045

(51) Int. Cl.
*G06F 21/00*    (2013.01)
*G06F 11/07*    (2006.01)
(Continued)

(52) U.S. Cl.
CPC ...... *G06F 11/0736* (2013.01); *G06F 11/1004* (2013.01); *G06F 21/64* (2013.01);
(Continued)

(58) Field of Classification Search
CPC .. G06F 11/0736; G06F 11/1004; G06F 21/64; G06F 21/44; G06F 21/565; G06F 2201/83
See application file for complete search history.

(56) References Cited

U.S. PATENT DOCUMENTS

| 5,668,947 A | * | 9/1997 | Batcher | G06F 11/277 |
| | | | | 714/E11.169 |
| 6,549,568 B1 | * | 4/2003 | Bingel | H04W 52/226 |
| | | | | 375/222 |

(Continued)

FOREIGN PATENT DOCUMENTS

DE    102010037457    3/2012

OTHER PUBLICATIONS

PCT International Search Report and Written Opinion of International Searching Authority dated Dec. 14, 2021 corresponding to PCT International Application No. PCT/EP2021/074357 filed Sep. 3, 2021.

(Continued)

*Primary Examiner* — Ghodrat Jamshidi
(74) *Attorney, Agent, or Firm* — Cozen O'Connor

(57) ABSTRACT

A method, device and computer program product for securing access to an encoded variable in a computer program with a plurality of encoded variables that each having its own dynamic signature, wherein when the encoded variable is accessed, the dynamic signature of the variable is modified, where the sum value for all dynamic signatures of all other encoded variables is controlled in an encoded tracer variable, the sum value being controlled in the tracer variables is adapted if a dynamic signature of one of the encoded variables is modified, the encoded variable is compared with the sum value stored in the encoded tracer variable to monitor the sum of the dynamic signatures, and where an error handling process is initiated in the event of a discrep- (Continued)

ancy such that all signatures in an arithmetically encoded program can be managed in a high-performance manner regardless of the complexity of the program.

13 Claims, 2 Drawing Sheets

(51) Int. Cl.
    *G06F 11/10*       (2006.01)
    *G06F 21/64*       (2013.01)
    *G06F 21/44*       (2013.01)
    *G06F 21/56*       (2013.01)

(52) U.S. Cl.
    CPC ............ *G06F 21/44* (2013.01); *G06F 21/565* (2013.01); *G06F 2201/83* (2013.01)

(56) References Cited

U.S. PATENT DOCUMENTS

| | | | | |
|---|---|---|---|---|
| 7,336,682 | B2* | 2/2008 | Singh | H04L 12/4633 |
| | | | | 370/392 |
| 8,089,861 | B1* | 1/2012 | Rahim | H04L 63/123 |
| | | | | 370/216 |
| 9,680,848 | B2* | 6/2017 | Kim | G06F 21/566 |
| 2008/0243701 | A1* | 10/2008 | von Mueller | G06Q 20/367 |
| | | | | 705/50 |
| 2012/0039469 | A1* | 2/2012 | Mueller | G06Q 20/204 |
| | | | | 380/252 |
| 2013/0262938 | A1 | 10/2013 | Schmitt et al. | |
| 2016/0134422 | A1* | 5/2016 | Smith | H04L 9/3242 |
| | | | | 713/165 |
| 2017/0193003 | A1* | 7/2017 | Vijayan | G06F 3/0647 |
| 2018/0060224 | A1* | 3/2018 | Shavro | G06F 11/3672 |

OTHER PUBLICATIONS

International Preliminary Report on Patentability dated Dec. 9, 2022 based on PCT/EP2021/074357 filed Sep. 3, 2021.
Schiffel, Ute et al: "ANB- and ANBDmem-Encoding: Detecting Hardware Errors in Software"; In: "ICIAP: International Conference on Image Analysis and Processing; 17th International Conference, Naples; Italy; Sep. 9-13, 2013. Proceedings"; Jan. 1, 2010; Springer; Berlin; Heidelberg 032548; XP055448350; ISBN: 978-3-642-17318-9 Bd. 6351; Seiten 169-182; DOI: 10.1007/978-3-642-15651-9_13.
Hoffmann, Martin et al: "dOSEK: the design and implementation of a dependability-oriented static embedded kernel"; 21st IEEE Real-Time and Embedded Technology and Applications Symposium; IEEE; Apr. 13, 2015; pp. 259-270; XP032777211; DOI: 10.1109/RTAS.2015.7108449.

* cited by examiner

METHOD AND DEVICE FOR SECURING ACCESS TO ENCODED VARIABLES IN A COMPUTER PROGRAM

CROSS-REFERENCE TO RELATED APPLICATIONS

This is a U.S. national stage of application No. PCT/EP2021/074357 filed 3 Sep. 2021. Priority is claimed on European Application No. 20199045.4 filed 29 Sep. 2020, the content of which is incorporated herein by reference in its entirety.

BACKGROUND OF THE INVENTION

1. Field of the Invention

The invention relates to a method, device and computer program product for securing access operations to coded variables in a computer program.

2. Description of the Related Art

In security-oriented programs for industrial applications, which typically run on embedded hardware, such as programmable logic controllers (PLCs) or other industrial automation components, it is necessary to ensure that bit errors in variables are identified and that program portions intended to be executed in a cycle are also actually run through completely.

When processing functionally secure data, internal security function errors must be identified and result in a security response (for example, outputting secure replacement values or a warning notification). This is conventionally achieved by hardware replication and result comparison. One alternative is that of coding the security function using arithmetic codes. Simple arithmetic codes do not identify all errors and must be upgraded appropriately. This typically leads to considerable outlay and/or restricts use.

In more advanced security-oriented solutions, a hardware-independent version of coded processing is used. Coded processing involves detecting and propagating error information in all variables. To date, this has led to complex applications that cannot be replicated appropriately.

There is thus a need for a method of linear complexity for detecting and propagating errors in complex software systems for security-oriented programming by way of arithmetic codes.

Examples of Complex Applications:
Asynchronous change of data (for example, operations through human machine interface (HMI))
Remanent data
Nested programs (IF-THEN-ELSE, LOOP, and the like)
Global data
CIR (Change in Run—program or execution changes at runtime)
Cloud-based safety applications According to the current prior art, there are the following solution strategies:

Redundancy/diversity: The security program is executed independently multiple times, such that "common causes" (common error causes) can be ruled out. Depending on the complexity of the application, this approach requires considerable outlay to synchronize the executions and to reliably detect the errors.

In "distributed safety", the actual error rate to be expected is estimated based on the HW model in relation to the CPUs upon which the security program executes. The model must be estimated and defined separately for each HW.

Dynamic signature for each variable: Each variable receives a dynamic signature. This signature is changed each time the variable is changed. The effort in terms of managing the dynamic signature increases with the complexity of the application program. Even in the case of single applications, the effort in terms of management owing to small changes in the control structure has doubled.

The documents Schiffel et al. "ANB- and ANBDmem-Encoding: Detecting Hardware Errors in Software" (SAFECOMP 2010, LNCS 6351, pp. 169-182) and DE102010037457A1, also Schiffel et al. "Data processing method for providing a value for determining whether an error has occurred in the execution of a program [ . . . ]" discloses summing signatures of program portions that have been run through in an accumulator value and checking the program execution based on the accumulator value by way of a checking circuit.

In sum, it may be said that the conventional approaches in accordance with the prior art, with the at present greatly increasing complexity in terms of requirements, are becoming less and less suitable as a general solution for new solutions. They have to be supplemented with complexity management measures that allow the complexity of the security program to differ from the complexity of the corresponding standard program only to an insignificant extent.

The invention is particularly suitable for coded processing.

In coded processing, the variables are coded. To this end, values (xf) are coded in variables via AN, ANB (AN+B) and ANBD codes or via mixed codes (mixed methods), i.e., mapped onto coded values. In the example of ANBD coding, all numerical variables are coded in accordance with a rule in the form:

$$x_c := x_f * A + B_x + D_x$$

and the arithmetic operations (+, −, *, /, etc.) are modified such that the processing in the coded region (xc) delivers consistent results with respect to the original region (xf).

In this case:
A is a system constant that is identical for all coded values.
$B_x$ is a static signature of x. In other words, each value of x has its own value of $B_x$, and $B_x$ is constant.
$D_x$ is the dynamic signature of x. $D_x$ changes at regular or irregular intervals, for example in each cycle of a program or in a time-controlled manner.

Using the coded variables, it is possible to identify errors that result, for example, due to a random change or distortion of single bits. In other words, the values to be coded are mapped onto coded values such that it is possible to identify the deviation of single bits, because errors in individual bits, such as due to the Hamming distance of permissible coded values, give rise to invalid values in the coded space.

The complexity of the security program is dependent in particular on the type of management of $D_x$ The complexity remains manageable when $D_x$ is stored. This requires $D_x$ to be stored in the same way as $x_c$.

However, securely storing each value of $D_x$ in a secure variable considerably increases the complexity and the resource requirement of the secure software system.

SUMMARY OF THE INVENTION

In view of the foregoing, it is an object of the present invention to simplify the management of dynamic signatures in coded processing such that this is possible with low complexity without doing away with security. It is another object of the invention to ensure or determine, in a simply way, whether program portions intended for execution (for example, "basic blocks") are actually executed.

The essential idea for achieving the objects is that of independently computing the signatures of coded variables in 2 channels. Here, the sum of all dynamic signatures is combined in a single coded variable, the "tracer variable", with the diversified calculation of the signature thereof.

These and other objects and advantages are achieved in accordance with the invention a method for securing access operations to at least one coded variable in a computer program comprising a multiplicity of coded variables, where each coded variable preferably has its own dynamic signature. Here, in the event of an access operation to such a coded variable, its dynamic signature is changed in a prescribed way. A sum value for all dynamic signatures of all other coded variables is carried in a coded tracer variable, where, in the event of a change in a dynamic signature of one of the coded variables, the sum value carried (stored) in the tracer variable is modified in the same way, where, for the check, the sum of the dynamic signatures of the coded variables is compared with the sum value stored in the coded tracer variable, and where error handling is triggered in the event of a discrepancy. This allows efficient management of all signatures in an arithmetically coded program, independently of the complexity thereof.

The objects and advantages in accordance with the invention are furthermore achieved by a device for securing access operations to at least one coded variable in a computer program, in particular a security-oriented automation application, comprising a multiplicity of coded variables, wherein the computer program is executed on the device that includes a processor and memory, in particular on a computer or on an industrial automation component, and where each coded variable has its own dynamic signature, where the device is configured to perform the method in accordance with the invention. This device makes it possible to achieve the advantages already discussed with reference to the method.

The objects and advantages in accordance with the invention are furthermore achieved by a computer program product for securing access operations to at least one coded variable in a computer program, in particular a security-oriented automation application, comprising a multiplicity of coded variables, where the computer program product is configured such that, when it is executed on a device including a processor and memory, in particular on a computer or on an industrial automation component, the method in accordance with the invention is implemented. This computer program product makes it possible to achieve the advantages already discussed with reference to the method.

In accordance with the invention, the sum value of all dynamic signatures is formed in the course of the check, where it is assumed, in one embodiment that, for each coded variable, a (preferably uncoded) variable or register or the like, linked thereto, comprising the in each case valid value (i.e, last changed and currently being used in the associated coded variable) of the dynamic signature is carried. In one embodiment, the dynamic signature values are stored in an array. This simplifies the summing in the checking step. As an alternative, however, it is also possible to take the respective value of the dynamic signature from the coded variables by in each case subtracting the static signature from the value of the coded variable and linking the result in a modulo operation to the system constant "A". This alternative is more expensive to implement (computing time), but works without separately storing the dynamic signatures.

In accordance with the invention, prior to the comparison, a respective modulo operation comprising the system variable ("A") used to code all coded variables and to code the tracer variable is applied to the sum of the dynamic signatures and is also applied to the sum value carried in the tracer variable, possibly also multiple times, such that any overflows in the case of very large offset values for the access operation-induced changes in the dynamic signatures are avoided.

In one advantageous embodiment of the method according to the invention, AN, ANB or ANBD coding is used to code the coded variables. These coding operations are successfully incorporated in security-oriented computer programs, in particular in those used in automation engineering.

Advantageously, upon each write access operation to a coded variable, a new or changed dynamic signature is defined for this variable, such that the number of particularly critical write access operations can be ascertained based on the signature sum. Particularly advantageously, upon each read access operation to a coded variable, a new or changed dynamic signature is also defined for this variable.

Due to the fact that each coded variable has its own dynamic signature, upon a change in this signature, i.e., upon each access operation, only the signature of this variable must be modified and the value of the tracer variable is changed in the same way, whereas, in the case of a dynamic signature, which is often usually shared in the prior art, of a large number of or all variables, each coded variable then must also be changed.

Advantageously, the prescribed way in which the dynamic signature is changed is that of either always adding or always subtracting a defined value, the "offset", other than zero to or from the previous dynamic signature of the respective coded variable. Successive changes thus cannot compensate for one another in an undesired manner.

Advantageously, the sums of all signatures, i.e., the sum of all static signatures and the sum of all dynamic signatures, each give a correctly coded value in accordance with the selected coding. This simplifies the calculations involving the sum values and also enables further checks with regard to bit errors and the like in the signatures.

The advantages of the method in particular become evident when the computer program is an automation program of an industrial automation component, and when the check is performed at least once in a cycle of the automation program, preferably at the end of the cycle. Cyclic automation programs are, on the one hand, often used in security-critical fields, but are also well-suited, on the other hand, due to their cyclic execution structure, to having their execution checked by way of the signatures of the coded variables. Here, the complete execution of all program portions intended to be executed in a respective cycle of the computer program is advantageously defined as the securing of the access operations via the signature changes.

This may be achieved by comparing the sum, coded in the tracer variable, of the dynamic signatures with an expected value, where the expected value corresponds to the product of the offset and the number of expected access operations to the coded variables.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment of the method in accordance with the invention is explained below with reference to the drawings, which are used simultaneously to explain an exemplary embodiment of a device and a computer program product of this kind, in which.

DETAILED DESCRIPTION OF THE EXEMPLARY EMBODIMENTS

In order to check a program sequence, the prior art uses running variables, so-called tracer variables or "tracer" for short, using the content of which the program path that is run through can be logged and thus checked.

Figure 1:
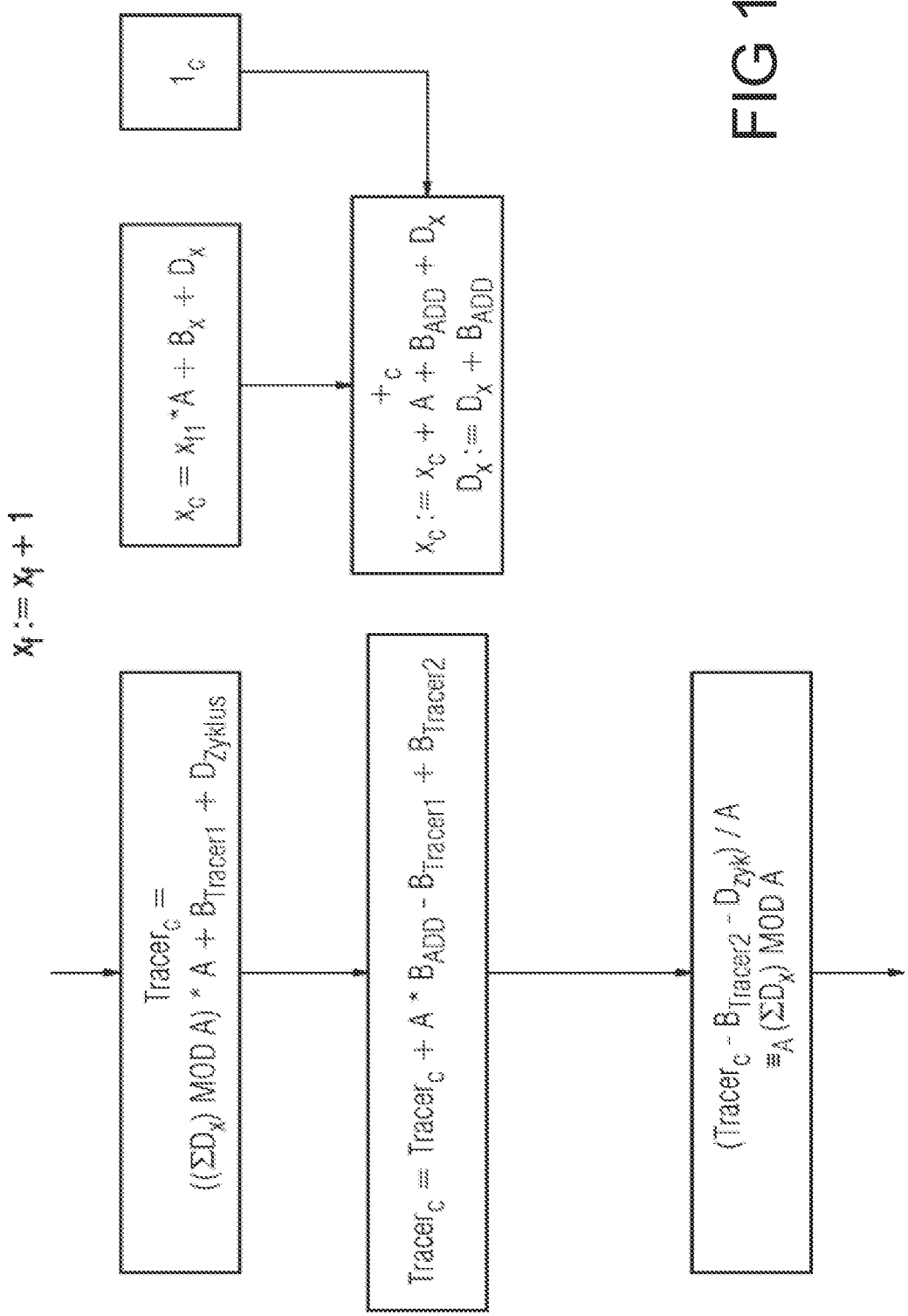
FIG. 1 shows the securing of an addition to form a coded variable in accordance with the invention.

With reference to FIG. 1, in the present example, the tracer variable $Tracer_c$ is used to check the dynamic signatures of all coded variables of a computer program and the access operations to all coded variables of the computer program. The present example in this regard shows the coded variable $x_c$.

In the present example, without restricting generality, the variable $x_c$ is ANDB-coded in accordance with a rule in the form:

$$x_c' = x_f * A + B_x + D_x$$

In this case, $D_x$ is the dynamic signature of x. $D_x$ changes at regular or irregular intervals, for example, in each cycle of a program, or in a time-controlled manner. The change of $D_x$ is often predefined externally in the prior art, which means that the dynamic signature is changed in the prior art asynchronously with the execution of a computer program, in particular an automation program. In the prior art, the dynamic signature $D_x$ is often constant during a cycle. In the present exemplary embodiment, $D_x$ however changes upon each access operation (read or write) to the coded variable xc; in other embodiments, $D_x$ may, for example, change only upon write access operations. In other words, based on the starting value (initialization value or the like) of $D_x$ and the change value used for the change upon each access operation, the number of access operations in a basic block, i.e., a program section to be run through linearly of a computer program, can be calculated from the current value of $D_x$ and compared with an expected value, such that it is possible to check the complete execution of a program step.

In accordance with the invention, the D-signatures are then allocated such that the sum of all signatures $(B_x; D_x)$ always gives a correctly coded ANBD-coded value.

It thus holds that:

$$(\Sigma_x B_x) \bmod A = B_{sum}$$

$$(\Sigma_x D_x) \bmod A = D_{sum}$$

It is assumed that, for each coded variable, the respective currently applicable values of the signature constants Bx and Dx are stored in a separate variable, memory, register or bit range reserved therefor of the coded variable.

The B-signatures are constant. The sum $B_{sum}$ is therefore also constant. The value of the sum is in this case unimportant.

This sum of the dynamic signatures $D_{sum}$ is compared with a coded value $Tracer_c$, the signature of which differs either only by a fixed value from the signature of the sum or stores the signature correctly in coded form; the variants thus have the form:

$$Tracer_c = A * X + B_{tracer} + D_{sum}$$

or $$Tracer_c = A * D_{sum} + A^2 * X + B_{tracer} + D_{tracer}$$

The value of X in both embodiments is unimportant for the concept of the invention. It is used, as is conventional, to simplify the calculation of $Tracer_c$. It may also be used to satisfy additional security requirements.

In accordance with the invention, the sum $D_{sum}$ of the D-signatures of all coded variables is calculated at a checkpoint of a computer program, such as at the end of a cycle of an automation program. $D_{sum}$ is additionally calculated in a diversified manner from the content of a coded tracer variable $Tracer_c$, the value thereof being changed in the same way upon each access operation to xc in which the associated value of $D_x$ is changed.

A basic block under consideration here consists of a linear sequence of computing steps; in the present example from FIG. 1, a basic block is shown on the right-hand side and adds, in coded arithmetic, the number "1" to the coded variable xc.

Each computing step of a basic block has a fixed number of access operations to coded values. $D_{sum}$ therefore changes by a constant value. The change of $D_{sum}$ is therefore also constant for the entire basic block (as it is referred to in the literature). This change (possibly multiplied by A) also must be added to the tracer, i.e., the tracer variable $Tracer_c$. The tracer is thus coded such that it can be checked for correctness.

It holds that, in the error-free case, depending on the selected structure of the tracer variable:

$$Tracer_c = A * X + B_{tracer} + D_{sum}$$

or $$Tracer_c = A * D_{sum} + A^2 * X + B_{tracer} + D_{tracer}$$

This method means that now only $Tracer_c$ still needs to be secured using the conventional methods up to now, ti.e., for example, $Tracer_c$ must be stored and processed in coded form; in the case of lower security requirements, $Tracer_c$ may also be uncoded. An action that changes the program sequence or the data therefore must be supplemented with a fixed command sequence to provide security only for $Tracer_c$, so that the number of access operations remains compliant with the expected value. Up until now, the supplementing occurred separately for each impacted coded variable.

In one advantageous embodiment, the D-signatures are corrected such that $D_{sum}$ corresponds to the ID of the basic block at a clearly defined location in the basic block (for example, end of the basic block). This results in a simple checking option. $D_{sum}$ repeats cyclically. Accordingly, this check is not suitable for higher SIL (security levels).

At the end of the cycle or program, a consistency check then occurs with 2 criteria:

1. $\text{Tracer}_c$ is coded correctly and

2. $((\text{Tracer}_c - B_{tracerload} - D_{cyc})/A) \text{ MOD } A = (\Sigma D_x) \text{ MOD } A$ It is assumed here that the B-signature may change; in the consistency check, the last valid value for B, i.s., $B_{tracerload}$ ("last valid B of the tracer variable") then has to be used. It is also the case in this example that the D-signature in one cycle is constant, and therefore D is used as D cyc here (D from the current cycle).

In order to avoid/manage overflows, the value of the tracer variable may be limited, for example, by the operation $$\text{Tracer}_c := \text{Tracer MOD } A^2$$

when it holds that $$B_{tracerload} - D_{cyc} < A.$$

It bears noting the usual way of keeping the signature of coded variables consistent is that of addition of a constant in empty paths of branches or loops. If this is performed exclusively for $\text{Tracer}_c$, then the complexity of the coded processing remains linear with respect to the standard.

It is less important to secure the calculation of $\text{Tracer}_c$ here. For lower security levels, security may possibly be dispensed with.

FIG. 1 illustrates the execution of the coded operation to give $x_{fi} := x_f + 1$.

Here, the left-hand part of FIG. 1 shows the influence of the addition operation on the tracer variable $\text{Tracer}_c$, while the right-hand part of the figure illustrates the addition of 1 to the variable $x_c$ in the coded space.

The variable $x_c$ is defined as a coded variable, where the non-coded variable $x_{fi}$ or the value thereof is multiplied by the system variable A. The signatures $B_x$ and $D_x$ additionally add together to give the value of the coded variable $x_c$.

The value 1 provided for the addition is also processed in coded form with the coded operation $+_c$; the coded value $1_c$ likewise consists of the system constant A multiplied by 1, a signature $B_{ADD}$ (static signature) and the dynamic signature $D_x$.

In this example, the new dynamic signature $D_x$ results from the previous dynamic signature $D_x$ plus $B_{ADD}$. This new dynamic signature $D_x$ is stored in the system in association with the variable $X_c$. In one alternative (but less secure) embodiment, all coded variables in the system may have the same dynamic signature $D_x$.

The left-hand side of FIG. 1, in the same way as the addition process illustrated on the right (increment by 1), illustrates the handling of the coded tracer variable $\text{Tracer}_c$. The coded tracer variable $\text{Tracer}_c$ contains the sum of all previous dynamic signatures $D_x$ in coded form, with the modulo A operation MOD A ensuring that no overflow can occur due to the summing. The tracer variable $\text{Tracer}_c$ furthermore comprises its own static signature $B_{tracer1}$ and the dynamic signature $D_{cycle}$ ($D_{cyc}$ for short), where it is assumed here that the current dynamic signature of the tracer variable $\text{Tracer}_c$ is always retained in the system variable $D_{cycle}$.

The second row of the FIG. 1 then shows the supplementing of the tracer variable $\text{Tracer}_c$ with the addition process. In addition to the previous value of $\text{Tracer}_c$, A times $B_{ADD}$ is first added, because the "payload content" (sum of $D_x$) multiplied by the system variable A is kept in the coded tracer variable $\text{Tracer}_c$. The previous static signature $B_{tracer1}$ of the tracer variable $\text{Tracer}_c$ is also subtracted and a new, current static signature $B_{tracer2}$ is added to the value of the tracer variable $\text{Tracer}_c$. It may be seen that it is assumed, in this example, that the tracer variable $\text{Tracer}_c$, instead of a "conventional" static signature B, has a "quasi-static" signature $B_{tracer1}$ or $B_{tracer2}$ that likewise changes. This is advantageous because, although the remaining coded variables in the system now have a dynamic signature $D_x$ in accordance with disclosed embodiments of the invention, precisely the dynamic signature $D_{cycle}$ of the tracer variable is not able to be secured by the method of the invention. For this reason, a changing, quasi-static signature has advantageously been created here from the hitherto completely static signature $B_{tracer1}$ In other exemplary embodiments, in particular those that require a lower SIL (security integrity level), it is also possible to dispense with making the static signature of the tracer variable $\text{Tracer}_c$ dynamic in this way.

The third, bottom row in FIG. 1 shows the checking step in the evaluation of the tracer variable $\text{Tracer}_c$. Here, the top row shows the comparison operation ("modulo comparison") as to how the value of the tracer variable $\text{Tracer}_c$ is decoded; this corresponds to the conventional prior art method. The result must be identical "modulo" to the result of the computing operations shown in the second row. Here, a "modulo comparison" is performed with the sum of the dynamic signatures of all coded variables in the system, where the sum result is initially processed with a modulo A operation to eliminate the effect of any overflows beyond the numerical value of the system constant A. In the event that the comparison operation is not satisfied, it may be assumed that an error is present. In such a case, provision may be made for various measures, for example, outputting an error notification or using secure replacement values for system parameters or the like.

The sum kept in the tracer variable $\text{Tracer}_c$ of the dynamic signatures $D_x$ is, at the same time, a measure of the number of access operations to the coded variables. At least for basic blocks, i.e., linear program structures, the number of access operations to coded variables in a program cycle is fixed in each case. This number may be used as an expected value, the comparison of which with the content of the coded tracer variable $\text{Tracer}_c$ provides information as to whether the program code has been executed in a prescribed manner. It should be understood the value of the tracer variable must be decoded for this purpose (row 1) and the result divided by $B_{ADD}$ or another regular offset. As an alternative, the expected value might not consist of the number of expected access operations, but rather the expected sum signature value $\Sigma D_x$ or $(\Sigma D_x) \text{ MOD } A$. In the event of a discrepancy, error handling may likewise occur, as already discussed for the case in which there might be a discrepancy in the dynamic signatures as such.

Figure 2:
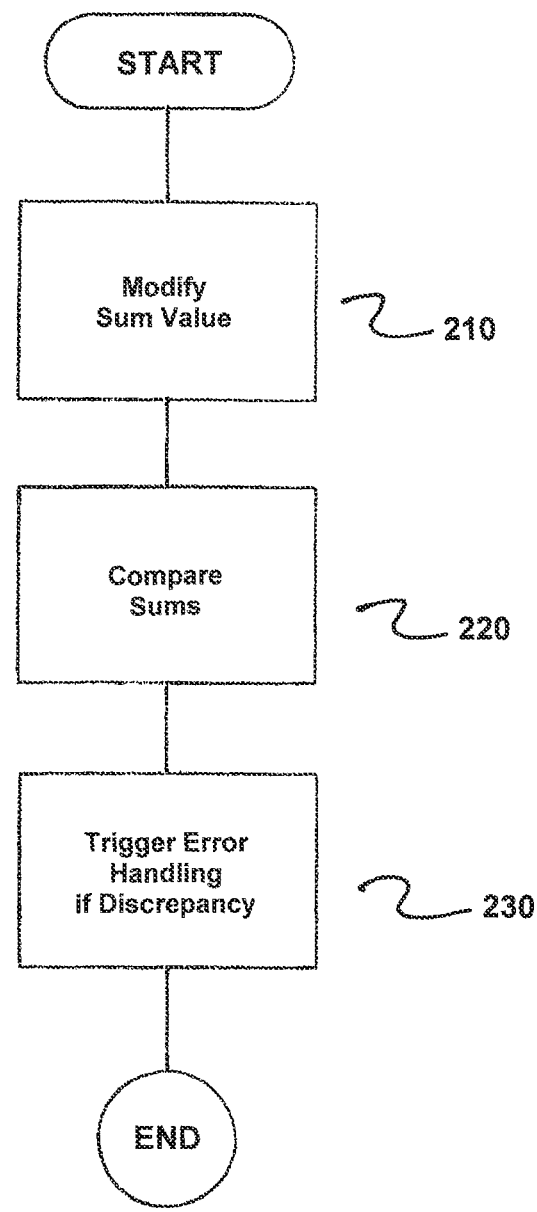
FIG. 2 is a flowchart of the method in accordance with the invention.

FIG. 2 is a flowchart of the method for securing access operations to at least one coded variable xc in a computer program comprising a multiplicity of coded variables, where a large number of or each coded variable xc includes a respective dynamic signature $D_x$, each respective dynamic signature $D_x$ is changed in a prescribed manner in the event of an access operation to the at least one coded variable xc and a sum value $\Sigma Dx$ for all dynamic signatures $D_x$ of all other coded variables xc is carried in a coded tracer variable Tracerc.

The method comprises modifying, in an event of a change in a dynamic signature $D_x$ of one of the coded variables xc, the sum value $\Sigma Dx$ carried in the tracer variable Tracerc in the same way as the prescribed manner, as indicated in step 210.

Next, for a check, the sum of the dynamic signatures $D_x$ of the coded variables xc is compared with the sum value $\Sigma Dx$ stored in the coded tracer variable Tracerc, as indicated in step 220.

Next, in an event of a discrepancy, error handling is triggered, as indicated in step 230. In accordance with the invention, the sum value $\Sigma Dx$ of all dynamic signatures $D_x$ is formed during the check. Furthermore, prior to the comparison, a respective modulo operation comprising system constants A utilized to code all coded variables xc and to code the coded tracer variable Tracerc is applied to the sum of the dynamic signatures $D_x$ and is also applied to the sum value $\Sigma Dx$ carried in the tracer variable Tracerc.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for securing access operations to at least one coded variable in a computer program comprising a multiplicity of coded variables, a large number of or each coded variable including a respective dynamic signature, each respective dynamic signature being changed in a prescribed manner in an event of an access operation to the at least one coded variable, and a sum value for all dynamic signatures of all other coded variables being carried in a coded tracer variable, the method comprising:
   modifying, in an event of a change in a dynamic signature of one of the coded variables, the sum value carried in the tracer variable in the same way as the prescribed manner;
   comparing, for a check, the sum of the dynamic signatures of the coded variables with the sum value stored in the coded tracer variable; and
   triggering, in an event of a discrepancy, error handling;
   wherein the sum value of all dynamic signatures is formed during said check; and
   wherein prior to said comparison, a respective modulo operation comprising system constants utilized to code all coded variables and to code the coded tracer variable is applied to the sum of the dynamic signatures and is applied to the sum value carried in the tracer variable.

2. The method as claimed in claim 1, wherein the coded variables are coded based on AN, ANB or ANBD coding.

3. The method as claimed in claim 1, wherein a new or changed dynamic signature is defined for a coded variable upon each write access operation to the coded variable.

4. The method as claimed in claim 1, wherein the prescribed way comprises either always adding or always subtracting a defined value other than zero to or from the previous dynamic signature of the respective coded variable.

5. The method as claimed in claim 1, wherein a sum of all signatures each give a correctly coded value in accordance with the selected coding.

6. The method as claimed in claim 1, wherein the computer program comprises an automation program of an industrial automation component; and wherein the check is performed at least once in a cycle of the automation program.

7. The method as claimed claim 6, wherein the check is performed at least once at an end of the cycle.

8. The method as claimed in claim 1, wherein a complete execution of all program portions intended to be executed in a respective cycle of the computer program is defined as a securement of access operations via the signature changes.

9. A device for securing access operations to at least one coded variable in a computer program comprising a multiplicity of coded variables which is executed on the device, a large number or each coded variable including a respective dynamic signature, the device comprising:
   a processor; and
   memory;
   wherein the processor is configured to:
      modify, in an event of a change in a dynamic signature of one of the coded variables, a sum value carried in the tracer variable in the same way as a prescribed manner via which each respective dynamic signature is being changed;
      compare, for a check, a sum of the dynamic signatures of the coded variables with a sum value carried in a coded tracer variable; and
      trigger, in an event of a discrepancy, error handling;
   wherein the sum value of all dynamic signatures is formed during said check; and
   wherein, prior to said comparison, a respective modulo operation comprising system constants utilized to code all coded variables and to code the coded tracer variable is applied to the sum of the dynamic signatures and is applied to the sum value carried in the tracer variable.

10. The device as claimed in claim 9, wherein the device comprises a computer or an industrial automation component computer readable medium.

11. A non-transitory computer-readable medium storing computer program for securing access operations to at least one coded variable in a computer program comprising a multiplicity of coded variables which, when executed on a computer or on an industrial automation component, causes access operations to at least one coded variable in a computer program comprising a multiplicity of coded variables, the computer program comprising:
   program code for modifying, in an event of a change in a dynamic signature of one of the coded variables, a sum value carried in the tracer variable in the same way as a prescribed manner via which each respective dynamic signature is being changed;
   program code for comparing, for a check, a sum of the dynamic signatures of the coded variables with a sum value carried in a coded tracer variable; and
   program code for triggering, in an event of a discrepancy, error handling; wherein the sum value of all dynamic signatures being formed during said check; and
   wherein, prior to said comparison, a respective modulo operation comprising system constants utilized to code all coded variables and to code the coded tracer variable is applied to the sum of the dynamic signatures and is applied to the sum value carried in the tracer variable.

12. The computer program product as claimed in claim 11, wherein the computer comprises an industrial automation component.

13. The computer program product as claimed in the claim 11, wherein the computer program product forms part of an upgrade to firmware or part of or an upgrade to an operating system of a computer.

\* \* \* \* \*